June 25, 1935.　　　　J. SCOTT　　　　2,005,757
DISPLAY SIGN
Filed Aug. 8, 1933　　　3 Sheets-Sheet 1

Inventor:
John Scott
By Hoguet & Neary
Attorneys

June 25, 1935.  J. SCOTT  2,005,757
DISPLAY SIGN
Filed Aug. 8, 1933  3 Sheets-Sheet 2

Inventor:
John Scott
By Hoguet & Neary
Attorneys

June 25, 1935.  J. SCOTT  2,005,757
DISPLAY SIGN
Filed Aug. 8, 1933  3 Sheets-Sheet 3

Inventor:
John Scott
By Hoguet & Neary
Attorneys

Patented June 25, 1935

2,005,757

UNITED STATES PATENT OFFICE 2,005,757

DISPLAY SIGN

John Scott, St. George, Staten Island, N. Y.

Application August 8, 1933, Serial No. 684,253

12 Claims. (Cl. 40—130)

This invention relates to light reflecting display devices, signs, signals and the like, and to letters, characters, trade mark designs and the like, adapted for use in such display devices, signs, signals, etc.

It is an object of the present invention to provide a display device or sign including in its display area letters or characters which possess a high degree of visibility whether viewed in daylight or illuminated by the various artificial lighting means heretofore employed or proposed for illuminating signs.

It is another object of the invention to provide a sign letter or character that possesses to an extraordinarily high degree the ability to reflect as diffused light rays, the light that impinges upon it from a light source and is further so constructed that such reflected light serves to make the letter or character visible when viewed by an observer from a wide angle with respect to the front of the sign. In fact, it is a feature of the present invention that the sign letters or characters may be viewed with a high degree of effectiveness through nearly the entire hemispherical light reflecting field in front of the sign.

It is still another object of the present invention to provide in a luminous sign an illuminating means of the gas-filled or so-called "neon tube" type in association with a novel form of light reflecting letter or character which is adapted, when the sign is being illuminated at night by means of the light emitted from the neon tube, to collect and reflect in a diffused form a relatively large proportion of the light rays emitted from such tube, and is further adapted, when exposed under daylight conditions and the neon tube is unlighted, to collect and reflect the light rays of direct or indirect sunlight in diffused form in such a way and to such a degree as to render unnoticeable, or at least to minimize, the undesirable effect of the outline of the neon tube above the sign letters or characters.

It is a further object of the present invention to produce a luminous sign wherein illuminating means, substantially concealed from the view of the observer, is so associated with a novel reflecting surface as to illuminate the same and create a particularly pleasing diffused lighting effect upon the reflecting surface while leaving the face of the sign area fully exposed for illumination by sunlight in the daytime.

It is a still further object of the invention to provide a luminous sign which may be lighted either by sunlight or other remotely generated light as desired and at the same time is associated with illuminating means disposed back of the exposed face portion of the sign, but nevertheless in light transmitting relation to a light reflecting surface portion of the sign area, thereby permitting of installation without any necessity for extending elements of the complete sign outwardly beyond the building line or other limiting boundary of the structure to which the sign is attached.

Further objects will appear from the detailed description taken in connection with the accompanying drawings in which;

Fig. 7 is a section taken on the line 7—7 of Fig. 6 with the reflectors and lighting tubes omitted.

Figure 13:
Figure 14:
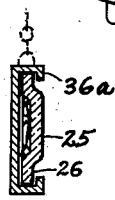

Fig. 13 is a front elevation and Fig. 14 is a section of still another modified form of sign wherein the appropriate combination of letters or characters is shown as molded in a single plate of glass, which is appropriately housed and adapted to be suspended in front of a shop, store or other business place in proximity to an artificial lighting source, not shown, or merely in position to collect and reflect the sun's rays.

Figure 1:
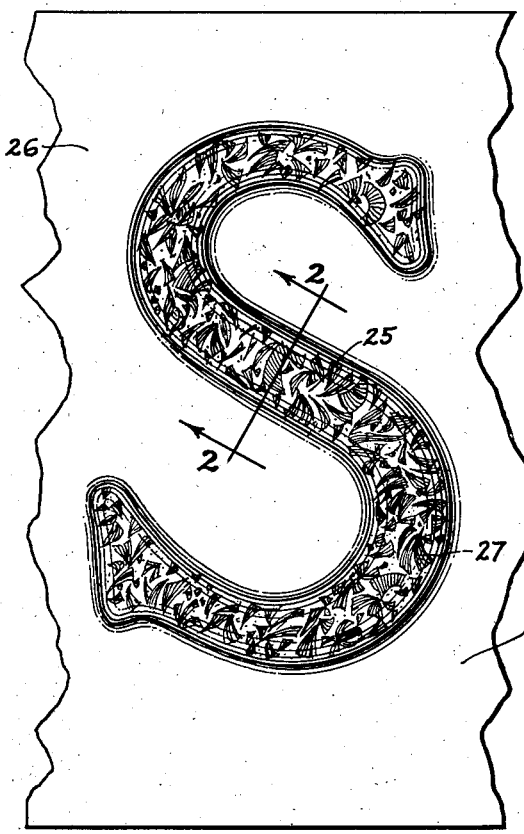
Figure 1 is a front elevation and Fig. 2 is a section on the line 2—2 of Fig. 1, illustrating the novel form of reflecting letter or character constituting one of the important features of my invention.
Figure 2:
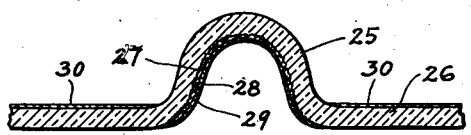
Figure 15:

Fig. 15 is a front elevation of a molded letter generally similar to the letters shown in Figs. 1 and 2, but modified to provide for passing a neon tube through the ends of the stroke of the letter.

Figure 16:
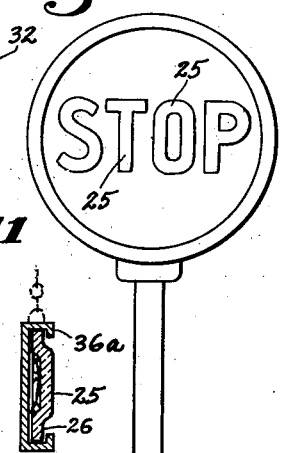

Fig. 16 is a front elevation of a stop sign embodying the basic principles of my invention.

Figure 17:
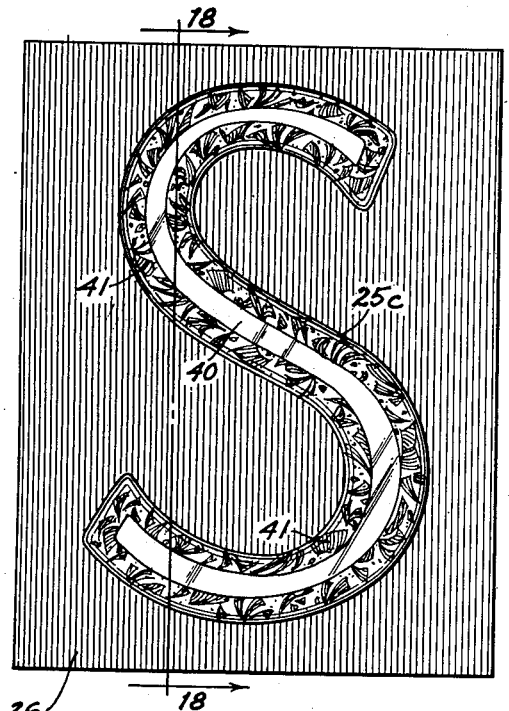
Figure 18:
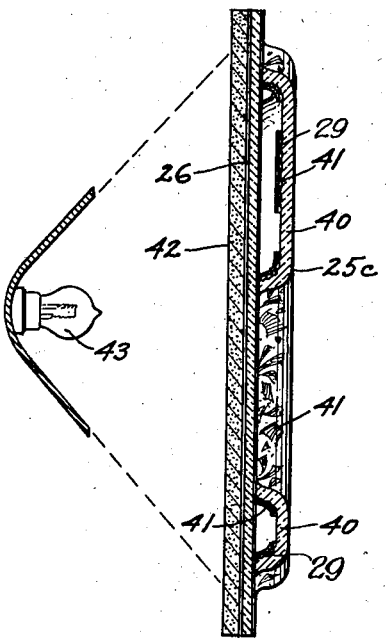

Fig. 17 is a front elevation and Fig. 18 is a vertical section of still another modification designed to be associated with illuminating means disposed behind the face of the sign.

Figure 19:
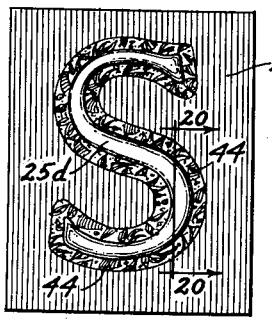
Figure 20:
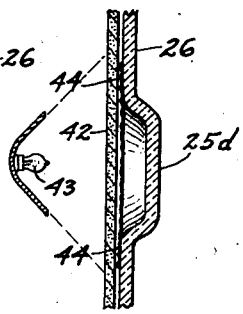

Fig. 19 is a front elevation and Fig. 20 is a vertical section of still another modification designed to be associated with illuminating means disposed behind the display side of the sign.

I am aware of the fact that it has been proposed heretofore to provide a roughened mirrored surface on the back of a plain clear glass plate for various ornamental purposes as well as in reflecting signs. It has also been proposed to form raised hollow letters of clear glass having smooth mirrored rear surfaces. However, so far as I am aware no one has heretofore proposed to form raised or depressed letters or characters of clear glass having a roughened and mirrored reflecting surface adapted to effect diffused reflection of light rays impinging thereon.

According to an advantageous and preferred form of my invention, sign letters or characters are molded from any suitable clear glass to a convexo-concave or other suitable generally curved or hollow cross section. The inner or rear side is then sand blasted and chipped to form a roughened surface possessing a multitude of small pits and surface irregularities which take on the the characteristic pattern of chipped glass. The rough surface is then coated with a suitable opaque material to produce a highly efficient reflecting surface. The opaque coating may be selected from the broad class of substance used in gilding or silvering or may be of any other substance that will form a reflecting coating when applied to a roughened or chipped surface of glass. It may be applied by painting or by various gilding and silvering processes known in the art.

While chipping produces the most satisfactory surface for the reflecting coating, I do not consider that my invention in its broader aspects is limited thereto. Other methods of roughening the glass, such as etching, sand blasting and certain types of grinding operations, produce a rough surface capable when coated of producing a highly desirable diffused reflection effect when illuminated. Therefore, the invention in certain of its broader aspects is to be understood as including reflecting glass letters, characters, trade mark designs, etc. disposed in either raised or depressed relation to a backing member with at least substantial portions of their surfaces disposed at an angle to the backing member or the general plane of the sign, and having inner mirrored surface portions characterized by innumerable irregularities and outer surface portions that are generally of the same contour as the inner surface, but free or substantially free from roughened spots and similar irregularities.

I am aware of the fact that it has been proposed heretofore to provide a roughened mirrored surface on the back of a plain clear glass plate for various ornamental purposes as well as in reflecting signs. It has also been proposed to form raised hollow letters of clear glass having smooth mirrored rear surfaces. However, so far as I am aware no one has heretofore proposed to form raised or depressed letters or characters of clear glass having a roughened and mirrored reflecting surface adapted to effect diffused reflection of light rays impinging thereon.

Figure 3:
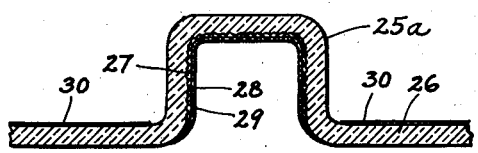
Fig. 3 is a section similar to Fig. 2 through a letter of different shape in cross section, but otherwise of the general form of the letter or character illustrated in Figs. 1 and 2.

My novel form of letter is shown generally in Figs. 1 and 2 where 25 represents the letter molded in the face of a glass plate 26. The rear surface 27 of the letter is shown as roughened by chipping. The chipped surface is covered by a coating of silver or other suitable mirroring material 28 which in turn is shown as covered by a coating of varnish or similar protective material 29. In Fig. 3 is shown a raised letter 25a similarly chipped and mirrored on the inner surface as in Figs. 1 and 2, but with a substantially rectangular cross section. In order to enhance the optical effect of the sign display, it is usually best to paint or otherwise coat the body of the glass plate around the strokes of the letters or other characters so as to produce a background of contrasting appearance or color, as at 30 in Figs. 2 and 3.

A sign made up of letters or other characters of the general forms illustrated in Figs. 1, 2 and 3 produces a striking effect even when used without artificial illumination. If positioned so as to catch the sun's rays directly, it will stand out brilliantly against any suitable contrasting background. At the same time, the irregularities in the mirrored surface serve to break up the light rays sufficiently to prevent undue glare and high lights. The resultant effect is one of diffused reflected sunlight which is pleasing to the eye and of sufficient volume to arrest the attention and show clearly the outline of the letters or characters making up the sign even when it is viewed at a relatively wide angle to the normal. When the sign is illuminated solely through the medium of reflected sun light or by means of light generally reflected from shop windows, street lights, etc., it still possesses value as an advertising medium. This will be understood when consideration is given to the fact that the positioning of the letters either in raised or depressed relation to the background has the effect of increasing the opportunities for light projected from sources disposed indiscriminately in the field in front of the sign to impinge upon areas of the mirrored surfaces. Since the mirrored surfaces are broken up into innumerable smaller surfaces of varying areas and disposed at various angles to one another, it results that the light that is received directly by some particular portion of the mirrored surface may ultimately, through refraction and reflection within the body of glass, be reflected back from other portions more favorably situated for reflection to the eye of the observer.

I have found that when gas-filled or so-called "neon tubes" are superimposed upon a display design of letters or characters of the general type of those shown in Figs. 1, 2 and 3, an improved display effect is obtained both in daylight and at night. When the sign is being operated at night the novel reflecting letters or characters reflect, in the form of diffused light rays, a greater part of the radiation from the tubes than has been possible with the background designs heretofore employed. The effectiveness of the display is thus increased without expenditure of any more electric current. At the same time, by associating the tubes with and in proper relation to reflecting letters or characters of suitable shape and that are mirrored for diffuse reflection according to the present invention, it is possible to produce a resultant effect by illumination which differs greatly from that of the present type of neon tube sign on the one hand and from the plain indirectly illuminated display on the other. This resultant effect may be described as an apparent merging of the glowing tube into the background of reflected light such that the observer has the illusion of seeing an indirectly lighted sign display carrying the soft color tones and diffused lighting effect of the neon tube.

Signs in which neon tubes are superimposed upon my improved reflecting letters or characters have the advantage in the daytime that sun light, whether direct or reflected, is reflected so efficiently from the reflecting letters as to make the outline of the superimposed unilluminated neon tube seem insignificant by contrast. By suitably proportioning the width and shape of the strokes of the reflecting letters or characters of the design relative to the neon tube characters superimposed above the reflecting letters or characters, it is possible to render the unlighted neon tube substantially unnoticeable in daylight when the sign is viewed at a distance. In fact the effect created may be such that the casual observer misses the fact that a neon tube is disposed in front of the reflecting surface.

Figure 5:
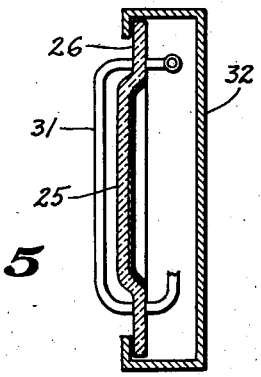
Fig. 5 is a section on line 5—5 of Fig. 4.
Figure 4:
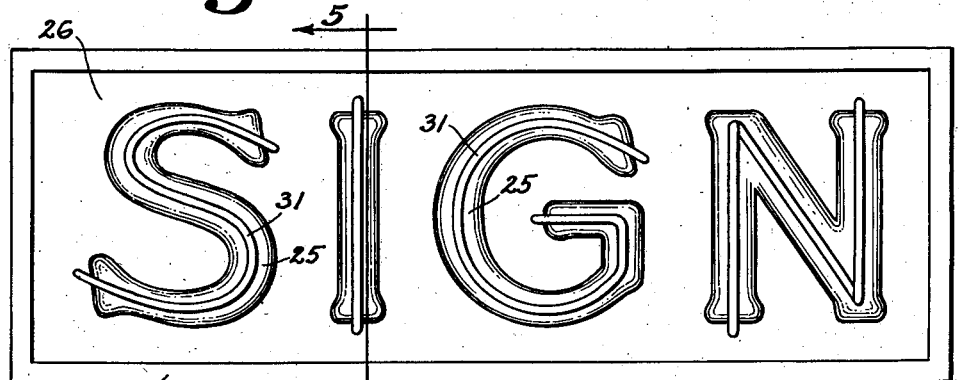
Fig. 4 is a front elevation of one embodiment of the invention wherein a plurality of letters similar to the one illustrated in Figs. 1 and 2 are molded in, or otherwise secured to, a plate of glass or other backing material and are shown with a neon tube as illuminating means superimposed upon and continuous with the strokes of the letters.

I have shown in Figs. 4 and 5 an arrangement of the improved reflecting letters or characters of the present invention in a neon sign. The neon tubes 31 are shown as superimposed upon the strokes of the letters 25 with their ends carried out through the back of the sign in known manner. The letters 25 are shown as associated with a plate of glass 26 forming the background of the sign and printed or otherwise colored to give an appropriate contrast effect. In large signs the letters are preferably molded separately from the glass backing plate and then cemented thereto. It will be understood that the background may be formed in various other ways, as for example by the use of sheet metal or other suitable material. The use of a stencil through which the glass letters are caused to project is also suggested. It will be understood that when metal is used proper care must be taken to insulate the neon tubing therefrom. Various other ways of mounting the reflecting glass letters will suggest themselves to the person skilled in the art. The glass letters and their supporting background are shown as enclosed within a housing 32 of conventional form. It will be understood that the neon tubes 31 may be connected back of the member 26 to form a continuous discharge to or may be connected separately with a suitable source of electric current.

Figure 6:
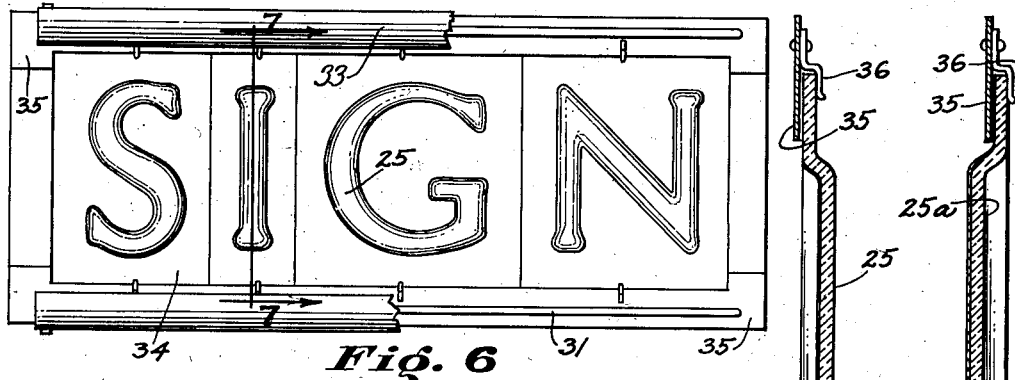
Fig. 6 illustrates another embodiment of the invention wherein a plurality of raised letters, forming separately removable units with their individual backing members, are associated with illuminating means disposed along the sides of the sign and normally concealed from the view of the observer.

Instead of superimposing neon tubes upon the strokes of the letters, the principles of my invention may be employed in a sign that is lighted by suitable illuminating means disposed in concealed position as respects the observer. This is illustrated in Fig. 6 where a plurality of letters 25 are shown as associated in a housing provided with reflectors 33 at the top and the bottom. A pair of neon tubes is shown as spaced outwardly from the face of the sign and behind the reflectors 33 so that light emitted from these tubes is projected upon the display area of the sign from the top and the bottom. Although neon tubes are shown, it will be understood that the same principles are involved when a bank of electric light bulbs is substituted and such a modification is to be understood as included within the scope of my invention. In addition to lighting means at the top and bottom, similar means may be provided at the sides to give a complete border illumination. The arrangement illustrated in Fig. 6 has the advantage that intricate bends in the neon tubes are avoided or minimized. At the same time the efficiency and advantages of neon tube illumination are secured without the disadvantages of the unsightly appearance of the unlighted tubes in daylight.

As further shown in the modification illustrated in Fig. 6, the individual letters or characters may be molded in or mounted on separate glass plates or other backing members 34, thus permitting of the separate removal and rearrangement of the letters as desired. This arrangement is not peculiar to the form of sign illustrated in Fig. 6 and may, of course, be applied with other arrangements of the lighting means. Signs provided with separately removable letters as shown in Fig. 6 are particularly suitable for theatres and in similar situations where it is necessary to frequently change the sign display.

Figure 8:
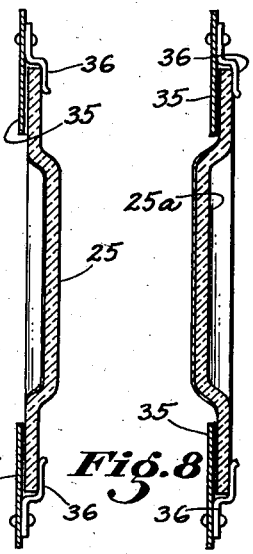
Fig. 8 is a section similar to Fig. 6 of a modified form of the sign wherein the individual letters or characters are depressed from the face of the sign in contrast to the raised letters of Figs. 6 and 7.

As shown in Figs. 7 and 8, the letters may be either raised from the face of the background as at 25 or of the depressed or channel type 25a. Certain of the advantages of the present invention may also be obtained by employing letters that are flush with the surface of the background, as, for example, letters produced by chipping and mirroring certain portions of the back of a plain flat plate of glass to form a desired display design of letters or characters. When such a display design is associated with neon tubes, with the tubes in superimposed relation upon the letters or characters making up the design, the advantages heretofore mentioned as respects improving the appearance of the sign in daylight illumination, may be realized.

While various means may be employed for securing the letters in position in the complete sign, I have shown in Figs. 7 and 8 a convenient and easily assembled holding means consisting of top and bottom plates 35 to which the letters are secured by suitable clip members 36.

Figure 9:
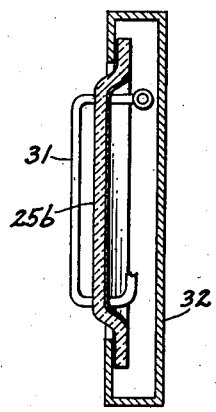
Fig. 9 is a section through a modified sign having letters generally similar to those shown in Figs. 4 and 5, but with a neon tube associated with the raised stroke of the letter in a new and improved manner.
Figure 10:
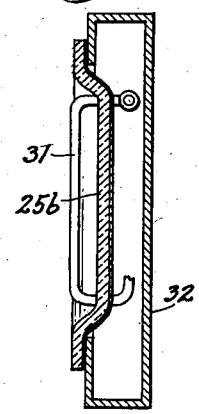
Fig. 10 is a section through a sign generally similar to Fig. 9 but having depressed letters and showing the novel arrangement of the neon tube when associated with letters of this form.

In Figs. 9 and 10 I have shown what I believe to be a further novel arrangement of neon tubes with reflecting letters. Heretofore in superimposing neon tubes above reflecting letters or characters it has been customary to lead the ends of the tubes through openings disposed beyond the ends of the strokes of the letters or characters forming the reflecting portion of the display. This adds to the structure of the sign that is exposed and becomes unsightly in daylight. I have found that when neon tubes are associated with reflecting letters or characters of the type here under consideration, it is more advantageous to lead the ends of the tubes out to the back of the sign through openings in the letters or characters.

This minimizes the extent of neon tubing that need be exposed in front of the sign and at the same time makes it easier for the light rays reflected back from the reflecting surface to conceal the outline of the superimposed neon tube when the sign is viewed in daylight. Furthermore, since the letters or characters are formed of glass, the requirements of the building codes generally in force respecting insulation of the neon tubes may be met by providing reflecting letters of sufficient width of stroke that they will afford to the tube the required space insulation. An elevation of a letter 25b of the form illustrated in Figs. 9 and 10 is shown in Fig. 15.

Figure 11:
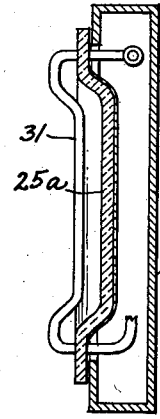
Fig. 11 is a section through a modified sign wherein depressed letters are associated with neon tubes which are led through openings in the backing plate beyond the ends of the stroke of the letter.

In Fig. 11 I have shown a letter 25a, of the general form of the one illustrated in Fig. 10, in association with a neon tube bent to conform to the shape of the channel and led through the back of the sign in the conventional manner.

Figure 12:
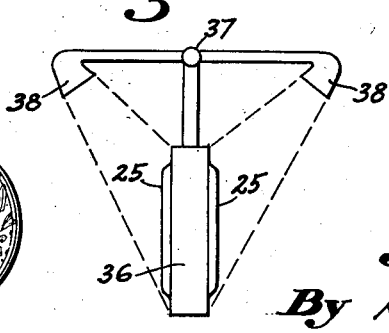
Fig. 12 is an end elevation of another modified form of sign adapted to be suspended at right angles to the building or structure to which it is to be attached and provided with raised letters on two sides and with illuminating means so that the sign may be viewed from two opposite directions.

For some purposes it is desirable to suspend the sign at right angles to the street, roadway or sidewalk in a position to be viewed from both sides. Such an arrangement is shown in Fig. 12 where two sets of letters or other characters 25 are assembled in a housing 36 suspended from an arm 37. Reflectors 38 are mounted on the arm 37 so as to direct light from a suitable source, say a neon tube or a row of electric light bulbs, upon the opposite faces of the sign.

In Figs. 13 and 14 I have shown a still further embodiment of my new reflecting sign wherein an appropriate combination of raised letters 25 is molded from a single plate of glass 26 and associated with a holder 36a, to form a sign adapted to be suspended in a store window or other desired location for advertising display purposes in position to reflect either sunlight or artificial light or both, as desired. The flat portion of the glass plate may be suitably painted or tinted to give a desired color effect.

In Fig. 16 I have shown the improved reflecting letters 25 in a highway stop sign making use of reflected sunlight in the daytime and reflected light from automobile headlights at night. In this situation my improved reflecting sign possesses distinct advantages over the signs that are now in use by reason of the greater direct and angular range of visibility of the sign. This is particularly the case when the letters are raised from the surface of the supporting plate. My improved type of reflecting sign is further particularly suitable for use in airway beacons and markers and is characterized by high visibility in fog and under conditions of haze and poor visibility.

In Figs. 17–20 I have shown several embodiments of still another modified form of letter employing the basic principles of my invention. This modified form is particularly adapted for use in cities where the building code provisions require that an unilluminated sign must not project beyond a specified short distance from the building line. This requirement is met in this modification by providing means for supplying light from behind the face of the sign, thus making it possible to operate the sign as an illuminated sign at night and as an unilluminated sign in the daytime. In the drawings, 25c represents a raised reflecting letter formed with a central area 40 of clear glass and border portions 41 of chipped or otherwise roughened and mirrored glass providing a highly reflective surface. The letter 25c is shown as cemented to a glass plate 26 which is painted or tinted to provide a contrasting background. In Fig. 18 the raised letter and its supporting backing plate 26 are shown as positioned in front of a suitable diffusing medium 42. The assembly thus formed is positioned in front of a suitable light source 43.

At night the clear glass portion of the sign letter will be illuminated by the light source disposed within the sign. In the daytime the reflecting surface portions of the raised letter will function to give the desired display value by diffused reflection of sunlight falling on such surfaces. For some purposes it may be preferred to eliminate the diffusing screen 42. This may be done by rendering the central area 40 of the letter translucent by an appropriate painting or other decorative method, as for example acid etching or sand blasting. Still further, an attractive diffused lighting effect simulating that of a neon tube or other gas-filled tube may be produced by using appropriately colored transparent glass, or forming the letter of clear glass and then tinting the central portion 40, preferably on the inside, to produce the appropriate color effect.

In Figs. 19 and 20 there is shown a further modification wherein a raised letter 25d is molded integrally with a glass plate 26 of clear glass. The raised letter portion is left in a clear transparent state. The portions of the glass plate immediately adjacent the raised letter are chipped and mirrored to form a reflecting border 44, completely surrounding the letter and adapted to reflect light falling thereon from sources outside the sign area in the daytime, and as well to reflect a portion of the light passing through the unmirrored portion of the glass letter from behind. The portions of the glass plate more remote from the letter may be painted or otherwise colored to form a contrasting background. In Fig. 20, a plate 26 is shown as associated with a diffusing screen 42 in front of a light source 43.

There again, as mentioned in described Figs. 17 and 18, the diffusing screen 42 may be omitted and an effect simulating that of the neon light may be produced by painting the inside of the clear glass letter with a suitable translucent paint. Similarly a diffused lighting effect may be produced in other ways by appropriately treating one of the surfaces of the glass letter to render it translucent. It will be understood that the reflecting surface portions of the raised letter, Figs. 17 and 18, and the reflecting border 44, Figs. 19 and 20, serves a useful purpose in night displays as well as in the daytime. Depending upon the relations and extent of the mirrored and clear portions and the treatment given to the clear portions to render them, or portions of them, translucent, it is possible to reflect upon the mirrored reflecting surfaces more or less of the light that impinges upon and passes through unmirrored portions of the letters from the light source behind the sign area. The light received in this manner by the reflecting surfaces illuminates them with pleasing effects.

It will be understood that where herein I have referred to glass letters and other sign characters, other normally transparent materials having similar refractive properties may be substituted. Chipping happens to be a process peculiarly applicable to glass, but other refractive materials may be molded, roughened and mirrored so as to obtain certain of the advantages of my invention. Insofar as such other materials may be used in the ways described herein, I mean to include them within the scope of my invention, and I use the term "glass" in the claims with intent that it shall be interpreted in this way.

While a number of embodiments of the invention have been described and illustrated, it will be understood that the invention is susceptible of various other embodiments and may be used in various other environments in the general art of reflecting and illuminated signs. It will be further understood that various changes may be made in the details without departure from the spirit of the invention which is not to be deemed as limited to the specific details and embodiments shown and described.

I claim:

1. A sign letter or character comprising a convexo-concave body of transparent glass shaped inside and out to the general form of the strokes of said letter or character and having a curved surface portion roughened and coated with a light-reflecting opaque material to form multitudinous angularly disposed irregular mirrored reflecting areas, said areas being arranged according to a substantially non-recurring pattern and adapted to diffusely reflect light impinged thereon.

2. A sign letter or character comprising a convexo-concave body of transparent glass shaped inside and out to the general form of the strokes of said letter or character and having the inner curved face roughened and coated with a light-reflecting opaque material to form multitudinous angularly disposed irregular mirrored areas, said areas being arranged according to a substantially non-recurring pattern and adapted to diffusely reflect light impinged thereon.

3. A sign letter or character formed of transparent glass and shaped inside and out to the general form of the strokes of said letter or character, said letter or character further having a surface portion chipped and coated with a light-reflecting opaque material to form multitudinous angularly disposed irregular mirrored areas adapted to diffusely reflect light impinged thereon.

4. A sign letter or character formed of a body of transparent glass channelled on one side and shaped inside and out to the general form of the strokes of said letter or character, said letter or character further having the inner face of said channel chipped and coated with a light-reflecting opaque material to form multitudinous angularly disposed irregular mirrored areas adapted to diffusely reflect light impinged thereon.

5. In a sign, character visible from within a selected field and tubular illuminating means superimposed upon and generally conforming to the strokes of said characters, said characters being formed of clear glass roughened and mirrored on the inner side so as to form reflecting surfaces characterized by innumerable small irregularities and to diffusely reflect light impinged thereon.

6. A sign comprising a combination of sign letters or characters associated in a display area, said characters being formed of transparent glass chipped and coated with a light-reflecting opaque material on one side to form multitudinous angularly disposed mirrored reflecting areas adapted to diffusely reflect light impinged thereon, and tubular illuminating means superimposed upon and generally conforming to the strokes of said sign letters or characters in light radiating relation thereto.

7. A sign comprising a combination of sign letters or characters associated in a display area, said characters being formed of convexo-concave bodies of transparent glass and shaped inside and out to the general form of the strokes of said letters or characters, and having curved face portions chipped and coated with a light-reflecting opaque material to form multitudinous angularly disposed mirrored reflecting areas adapted to diffusely reflect light impinged thereon and tubular illuminating means superimposed upon and generally conforming to the strokes of said sign letters or characters in light radiating relation thereto.

8. In a sign, characters visible from within a selected field and tubular illuminating means superimposed upon and generally conforming to the strokes of said characters, said characters consisting of bodies of transparent glass of convexo-concave form with the inner faces thereof roughened and coated with a light-reflecting opaque material to form mirrored surfaces adapted to diffusely reflect light impinged thereon.

9. In a sign, characters visible from within a selected field, said characters each consisting of a body of transparent glass of convexo-concave form with the inner faces thereof roughened and coated with a light-reflecting opaque material to form multitudinous angularly disposed irregular mirrored surfaces, said surfaces being arranged according to a substantially non-recurring pattern adapted to diffusely reflect light impinged thereon, and illuminating means disposed in light reflecting relation to said characters but outside the area defined by said characters.

10. In a sign, letters or characters associated in a display area, said letters or characters being shaped inside and out to the general form of the strokes of said letters or characters and having their inner faces chipped and coated with a light-reflecting opaque material to form mirrored reflecting areas adapted to diffusely reflect light impinged thereon, and illuminating means disposed in light reflecting relation to said characters but outside the display area defined by said characters.

11. A sign letter or character comprising a body of transparent glass having a general curved shape in cross section and shaped inside and out to the general form of the strokes of said character, and having selected portions of the inner walls thereof chipped and coated with a light-reflecting opaque material to form mirrored reflecting areas adapted to diffusely reflect light impinged thereon and having other portions of said inner walls uncoated and free to transmit light through said character.

12. In a sign, a sign letter or character comprising a convexo-concave body of transparent glass shaped inside and out to the general form of the strokes of said character and having selected portions of the inner curved walls thereof roughened and coated with a light-reflecting opaque material to form mirrored angularly disposed reflecting areas adapted to diffusely reflect light impinged thereon and having other portions of said inner walls uncoated and free to transmit light through said character, said sign letter being disposed in a display area, a light source arranged behind said area and a diffusing screen interposed between said light source and said sign letter.

JOHN SCOTT.